Dec. 16, 1924.  1,519,308
A. W. HOOD
BOLT
Filed Feb. 23, 1924
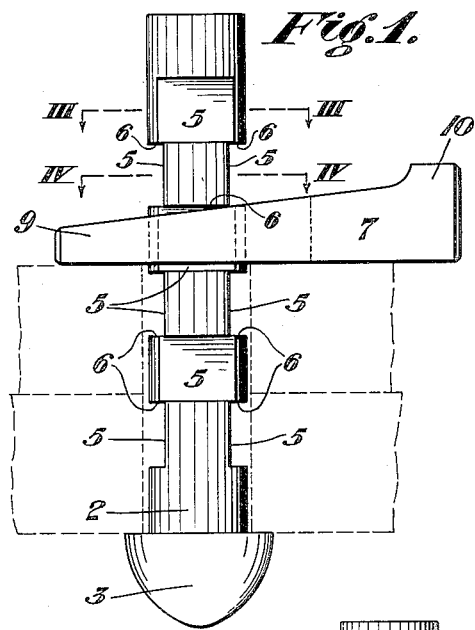
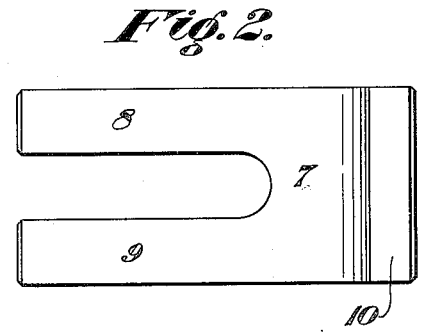
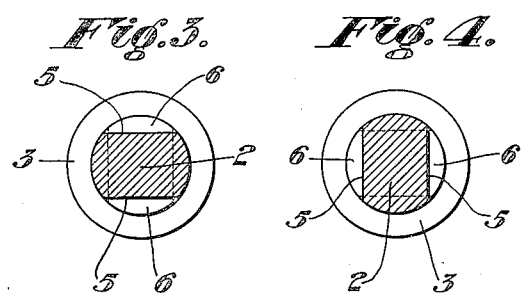
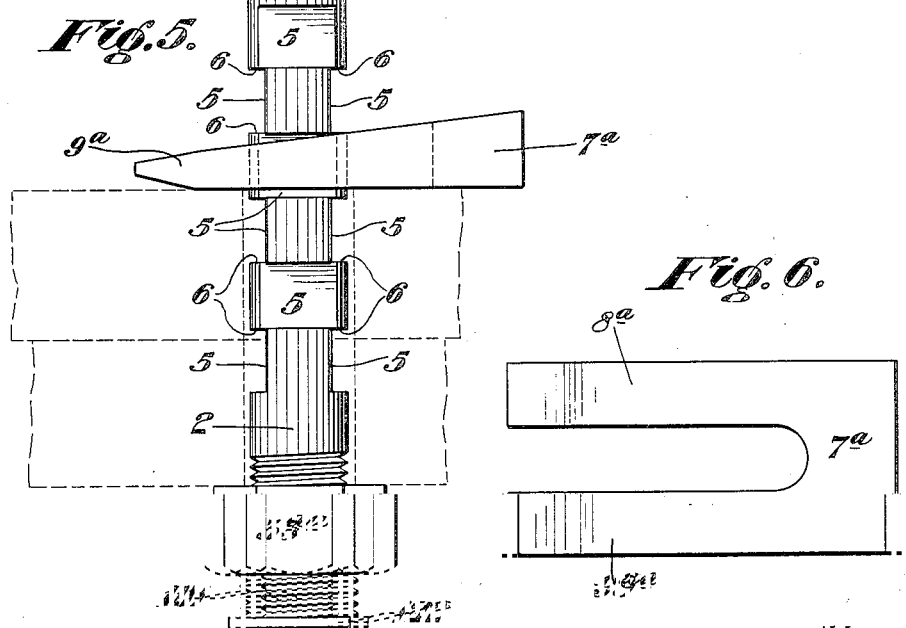

Patented Dec. 16, 1924.

1,519,308

UNITED STATES PATENT OFFICE.

ANDREW W. HOOD, OF PHILADELPHIA, PENNSYLVANIA.

BOLT.

Application filed February 23, 1924. Serial No. 694,757.

*To all whom it may concern:*

Be it known that I, ANDREW W. HOOD, a citizen of the United States, and resident of Philadelphia, in the county of Philadelphia and State of Pennsylvania, have invented certain new and useful Improvements in Bolts, of which the following is a specification.

This invention relates to bolts and particularly to bolts such as are used for drawing and temporarily holding a plurality of steel plates together before the latter are riveted, such bolts being known in the art as fitting-up bolts.

An object of the invention is to provide a bolt of this class having either an integral or fixed head or adjustable head and provided with a wedge-like locking member adapted to engage the bolt shank instead of a nut to draw and hold the plates or other work pieces together.

Another object is to provide a bolt of this class with a series of depressions along both sides of its shank for the reception of the locking member, so as to allow the locking member to engage and lock plates of varying thicknesses.

A further object is to provide a fitting-up bolt having the novel arrangement, construction, design, and combination of parts hereinafter described and illustrated in the accompanying drawings.

In the drawings, Figure 1 is a side elevation of a bolt constructed in accordance with my invention, showing it in position holding a pair of plates together, the plates being shown in dotted lines for clearness.

Figure 2 is a plan of the locking member.

Figures 3 and 4 are transverse sections of the bolt on the lines III—III and IV—IV of Figure 1.

Figure 5 is a view, similar to Figure 1, of a modified form of bolt.

Figure 6 is a plan of the locking member of the modified form of bolt.

Referring more particularly to the bolt of Figures 1 and 2 of the drawings, the numeral 2 designates the shank of the bolt, which is provided at one end with an integral head 3. The shank 2 is also provided intermediate its ends with a series of rectangular depressions 5 which are arranged opposite each other in pairs, and each pair of the depressions 5 extend at right angles to the next adjacent pair. The rectangular or squared depressions 5 terminate at the top and bottom in squared shoulders 6 adapted to form guideways for the U-shaped locking member 7.

The member 7 is tapered toward its open throat so as to provide what is in effect a U-shaped wedge and is adapted to fit around the shank 2 with its legs 8 and 9 in the depressions of one of the pairs of depressions 5. The large or head end of the member 7 is provided with a flange 10 to increase the head area.

In Figures 5 and 6 I have shown a bolt for the same purpose and of the same design as the bolt of Figures 1 and 2, except that the head member is adjustable and the locking member is slightly modified.

In this construction the shank 2 is provided with a series of screw threads 11 adjacent one end and a nut $3^a$ forming the adjustable head is screwed on and adjustable along the screw threaded portion of the shank 2. The head end of the shank 2 in this construction is upset as at 12 to prevent the removal of the head member $3^a$.

The locking member for this type of bolt is designated by the numeral $7^a$ and is slightly modified in that the taper of the leg portions $8^a$ and $9^a$ is slightly greater adjacent their free ends to form an entering wedge portion of slightly greater taper, and the head portion shown on the member 7 is omitted.

In operation, when it is desired to assemble or "stitch" fabricated structures together prior to riveting, the fitting-up bolts of this application will be inserted through the rivet holes, and the locking members entered in the pair of depressions or slots 5 nearest the piece. The locking members are then driven home, thus locking the structural members together. When the riveting operation is started the bolts will be removed as the riveting progresses by simply driving back the locking members with a hammer or other similar tool.

The bolt of Figures 5 and 6 is adapted to have its head $3^a$ adjusted by hand, so as to bring the depressions 5 into a more ideal locking position relative to the work than is possible when using a permanent head, as in Figures 1 and 2.

The bolts constructed in accordance with this invention entirely replace the bolts of ordinary construction now used in fitting up or stitching together fabricated structures in the shops, and entirely eliminate the necessity for the use of wrenches, various length bolts, etc., and also save considerable time and much labor heretofore consumed in screwing on and off the nuts on the standard bolts used.

Various modifications of my invention will readily suggest themselves to the skilled mechanics in the art and, therefore, I do not wish to be limited to the exact construction shown, but to define my invention only by the following claims.

I claim—

1. A fitting-up bolt comprising a shank portion and a head portion, in combination with a tapered U-shaped locking member, said shank portion being provided with a plurality of pairs of flattened depressions along its side walls, the depressions of each pair being opposite each other, and each pair of depressions extending at right angles to the next adjacent pair, and said locking member being adapted to fit around said shank with its legs in each of the depressions of any pair, so as to bind the work pieces together in which the bolt is mounted.

2. A fitting-up bolt comprising a shank portion provided with a screw threaded portion adjacent one end, in combination with a U-shaped tapered locking member, a head nut mounted on said screw threaded portion adapted to be threaded along said portion to provide an adjustable head, means for preventing the removal of said head nut, said shank portion being provided with a plurality of pairs of flattened depressions along its side walls, the depressions of each pair of depressions being opposite each other, and each pair of depressions extending at right angles to the next adjacent pair, and said locking member being adapted to fit around said shank with its legs in each of the depressions of any pair, so that when said member is driven home it will act as a wedge to draw and bind the work pieces in which the bolt is mounted together.

In testimony whereof I have hereunto signed my name.

ANDREW W. HOOD.